United States Patent [19]
Matsuzawa

[11] Patent Number: 6,005,653
[45] Date of Patent: Dec. 21, 1999

[54] METHOD AND APPARATUS FOR SEALING LIQUID CRYSTAL DISPLAY ELEMENT CELL

[75] Inventor: Tadashi Matsuzawa, Tokyo, Japan

[73] Assignee: NEC Corporation, Tokyo, Japan

[21] Appl. No.: 09/169,134

[22] Filed: Oct. 9, 1998

[30] Foreign Application Priority Data

Oct. 9, 1997 [JP] Japan .................................. 9-277062

[51] Int. Cl.⁶ ...................... G02F 1/1339; G02F 1/1341
[52] U.S. Cl. .......................... 349/154; 349/153; 349/189
[58] Field of Search .................................. 349/153, 154, 349/189

[56] References Cited

U.S. PATENT DOCUMENTS

| | | | |
|---|---|---|---|
| 5,278,682 | 1/1994 | Niki ........................................ | 349/189 |
| 5,359,442 | 10/1994 | Tanaka et al. ........................... | 349/189 |
| 5,548,428 | 8/1996 | Masaki et al. ........................... | 349/189 |
| 5,568,297 | 10/1996 | Tsubota et al. .......................... | 349/153 |
| 5,610,742 | 3/1997 | Hinata et al. ............................ | 349/122 |
| 5,629,787 | 5/1997 | Tsubota et al. .......................... | 349/153 |
| 5,742,006 | 4/1998 | Grupp et al. ............................. | 174/52.2 |
| 5,828,435 | 10/1998 | Kato et al. ............................... | 349/190 |
| 5,854,664 | 12/1998 | Inoue et al. .............................. | 349/92 |
| 5,856,859 | 1/1999 | Itoh et al. ................................ | 349/165 |

FOREIGN PATENT DOCUMENTS

| | | |
|---|---|---|
| 63-104017 | 5/1988 | Japan . |
| 63-163423 | 6/1988 | Japan . |
| 4-147217 | 7/1988 | Japan . |
| 2-124525 | 5/1990 | Japan . |
| 4-147217 | 5/1992 | Japan . |
| 5-34653 | 1/1993 | Japan . |
| 6-235896 | 8/1994 | Japan . |
| 7-5405 | 1/1995 | Japan . |

*Primary Examiner*—William L. Sikes
*Assistant Examiner*—Heidi L. Eisenhut
*Attorney, Agent, or Firm*—Sughrue, Mion, Zinn, Macpeak & Seas, PLLC

[57] ABSTRACT

A liquid crystal display element cell is obtained by setting two substrates to oppose each other at a predetermined gap and sealing a liquid crystal in the space formed between the substrates. An apparatus for sealing the liquid crystal display element cell includes seal rings, pressure plates, a pressure mechanism, and a compressed gas supply mechanism. The seal rings are formed to surround the display surface of the liquid crystal display element cell. Each seal ring has a Z-shaped section. Each pressure plate has a groove which fits with a corresponding seal ring therein, and a pressurized air injection port on the inner side of which is surrounded by the groove. Each pressure plate is placed on the upper and lower surfaces of the liquid crystal display element cell to be in contact with the seal rings. Pressure regions are formed in the spaces surrounded by the pressure plates, the liquid crystal display element cell, and the seal rings. The pressure mechanism presses the pressure plates with a predetermined pressure. The compressed gas supply mechanism supplies a pressurized gas of a predetermined pressure to the injection port.

14 Claims, 7 Drawing Sheets

METHOD AND APPARATUS FOR SEALING LIQUID CRYSTAL DISPLAY ELEMENT CELL

BACKGROUND OF THE INVENTION

1. Field of the Invention

The present invention relates to a method and apparatus for sealing a liquid crystal display element cell and, more particularly, to a method and apparatus for sealing a liquid crystal display element cell which uses Z-rings as seal rings for forming pressure regions that press the liquid crystal display element cell.

2. Description of the Prior Art

A liquid crystal display element cell is formed by forming an aligning film on a thin film transistor substrate (to be referred to as a TFT substrate hereinafter), applying a thermosetting adhesive also serving as a spacer around the display region of the aligning film surface by printing or the like, placing a color filter substrate (to be referred to as a CF substrate hereinafter) on the TFT substrate through the thermosetting adhesive, and adhering the TFT substrate and the CF substrate by calcining the thermosetting adhesive through heating and pressing. A liquid crystal is sealed in the liquid crystal display element cell.

When applying the thermosetting adhesive around the display region in order to seal the liquid crystal, a gap (called an opening) is formed in the thermosetting adhesive. The liquid crystal is sealed in the liquid crystal display element cell in the following manner. The liquid crystal display element cell is placed into a vacuum atmosphere. The opening is brought into contact with the liquid crystal placed in a liquid crystal plate or the like. Then, the atmosphere is restored to the atmospheric pressure, so that the liquid crystal is injected into the air gap of the liquid crystal display element cell due to the atmospheric pressure difference.

The air gap into which the liquid crystal has been injected has expanded to be larger than the gap formed by the spacer during calcining, and gap variations occur within the plane of the surface. For this reason, before sealing the opening with the ultraviolet-curing resin, the liquid crystal display element cell into which the liquid crystal has been injected is pressed from the front and lower surfaces to make the gap uniform.

When the liquid crystal display element cell is pressed by bringing a resin plate or air cushion into contact with it, the liquid crystal display element cell may crack due to foreign matter or the like sandwiched between the resin plate or air cushion and the liquid crystal display element cell, or the liquid crystal display element cell may not be uniformly pressed due to variations in size precision of the resin plate to cause a gap defect. Therefore, pressing is performed with a pneumatic pressure (Japanese Unexamined Patent Publication No. 7-5405 and the like).

FIG. 1 shows an example of a gap adjustment unit that employs pneumatic pressing.

FIG. 1 shows a liquid crystal panel adhering unit that employs pneumatic pressing. In an adhering unit 50, a structure obtained by setting first and second substrates 4 and 6 for forming a display panel to oppose each other through a seal member 54, and adhering them by calcination is placed in a pressure chamber 56. The peripheral portion of the substrate structure is sealed from above and below it through vacuum packing seal rings 60. Pressurized air from a pressurized air supply source 52 is supplied into sealed spaces, which are defined by the seal rings 60, the substrate structure, and partition plates 66 and 68 to form the pressure chamber 56 and a pressure chamber 57. The pressures in the pressure chambers 56 and 57 increase accordingly to form a bonded substrate structure.

A sealing apparatus which performs gap adjustment of a liquid crystal display element cell with pneumatic pressing using seal rings is described in Japanese Unexamined Patent Publication Nos. 4-147217, 5-34653, 6-235896, and the like.

The first problem of the prior art described above is as follows. When gap adjustment between the substrates is performed before injection of the liquid crystal, expansion of the liquid crystal panel that takes place during injection of the liquid crystal cannot be avoided. The second problem is as follows. To hermetically seal the pressure chambers, ordinary O-rings are used. In an O-ring having a circular section, the contact width of the contact portion between an O-ring 60 and a partition plate 66 is small, as shown in FIG. 2. When a pressurized gas is introduced into the sealed space, the gas leaks from the contact portion of the O-ring 60, and the substrate display surface cannot be uniformly pressed.

U-shaped seal rings 62 and 64 are also known, as shown in FIGS. 3 and 4. Although the length of a contact portion c or d through which the seal ring 62 or 64 is in contact with a partition plate 66 or 68 is large, the bonding pressure of the contact portion c or d does not increase sufficiently, and gas leakage may sometimes occur.

SUMMARY OF THE INVENTION

The present invention has been made in consideration of the above situation in the prior art, and has as its object to provide a method and apparatus for sealing a liquid crystal display element cell, in which the gap between the substrates of the liquid crystal display element cell in which a liquid crystal is sealed can be accurately set to a predetermined value.

In order to achieve the above object, according to the present invention, in the method and apparatus for sealing the liquid crystal display element cell in which the display surface of the liquid crystal display element cell is pressed with a gas, prior to sealing the opening of the liquid crystal display element cell, Z-rings each having a Z-shaped section are used as seal rings for forming pressure regions into which a pressurized gas is to be introduced to perform gap adjustment of the liquid crystal display element cell.

Since the seal ring is formed into a Z-letter shape, a hermetic state can be maintained even under a high pneumatic pressure. In other words, the area of the contact portion of the seal ring (to be referred to as the Z-ring hereinafter) increases, and the contact pressure can be increased by the pressure applied to the Z-ring, so that gas leakage will not be caused. Thus, a method and apparatus for sealing a liquid crystal display element cell, in which the liquid crystal display element cell can be uniformly pressed and the cell gap of the liquid crystal display element cell can be obtained with a high quality and high precision, can be provided.

More specifically, in the Z-ring, since the sealing width can provide a sufficiently larger area than that of a conventional O-ring, leakage does not occur from the contact point between the liquid crystal display element cell and the Z-ring. When a pressurized gas is applied to the Z-ring, the inclined portion of the Z-ring is lifted to the liquid crystal display element cell side due to the pressure of the pressurized gas, and the liquid crystal display element cell can be sealed with a higher pressure than the pressure that presses it.

In contrast to this, in an O-ring, since the sealing area is small, leakage can easily occur from the contact between the liquid crystal display element cell and the O-ring. When a high pressure is required, a desired gap cannot sometimes be obtained conventionally due to gas leakage.

With V-rings each having a V-shaped section, when a liquid crystal display element cell is clamped, the V-shaped portions are bent to seal the liquid crystal display element cell. Since a sealing width V is as small as the bending amount of the V-shaped portions obtained upon insertion of the liquid crystal display element cell, the anti-leakage performance for the pressurized gas is inferior to that of the Z-rings.

With seal rings each having a U-shaped section, the sealing width can be set to be equal to the sealing width Z of the Z-rings. However, the bonding strength in the contact portion between the Z-rings and the liquid crystal display element cell increases by the pressure of the pressurized gas, whereas in the U-shaped seal rings, the bonding strength does not increase since a force acts in the horizontal direction in which the pressurized gas flows. Hence, the anti-leakage performance of the U-shaped seal rings is inferior to that of the Z-rings in this respect.

The first effect of the present invention is that gas leakage does not occur when the liquid crystal display element cell is pressed. This enables uniform gap adjustment of the liquid crystal display element cell. This is due to the following reasons. Since the sealing width of the Z-rings can be set to be sufficiently larger than that of the conventional O-rings, leakage does not occur from the contact portion between the liquid crystal display element cell and the Z-rings. Also, since the inclined portions of the Z-rings are fitted to the liquid crystal display element cell side due to the pressure of the pressurized gas, the hermetic space can be sealed with a higher pressure than the pressure that clamps the liquid crystal display element cell.

The second effect of the present invention is that a plurality of liquid crystal display element cells can be processed simultaneously. This enables uniform gap adjustment of a plurality of liquid crystal display element cells. This is due to the following reason. When a plurality of pressure plates and liquid crystal display element cells are stacked, even if a pressure acts on the liquid crystal display element cells non-uniformly or the sealing position is undesirably shifted, since the anti-leakage performance of the Z-rings is superior to that of the conventional O-rings, the plurality of liquid crystal display element cells can be processed.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIGS. 9A and 9B are graphs showing the experimental results, in which FIG. 9A is a graph showing the result of an experiment conducted with an apparatus according to the present invention, and FIG. 9B is a graph showing the result of an experiment conducted with a conventional apparatus;

DETAILED DESCRIPTION OF THE PREFERRED EMBODIMENTS

Several preferred embodiments of a sealing method and apparatus according to the present invention will be described with reference to the accompanying drawings.

Figure 1:
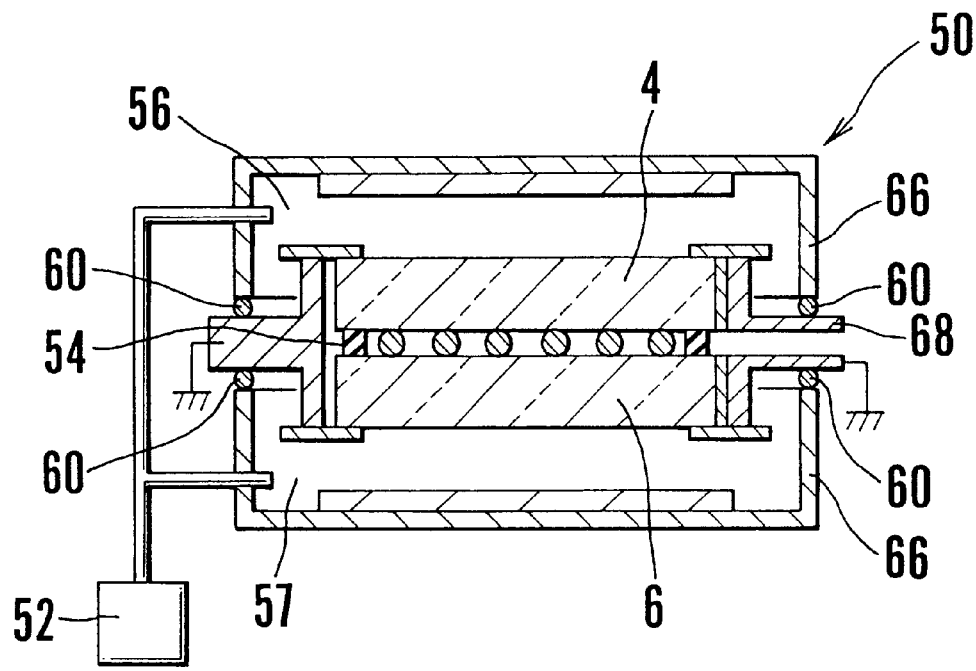
FIG. 1 shows a conventional example.
Figure 2:
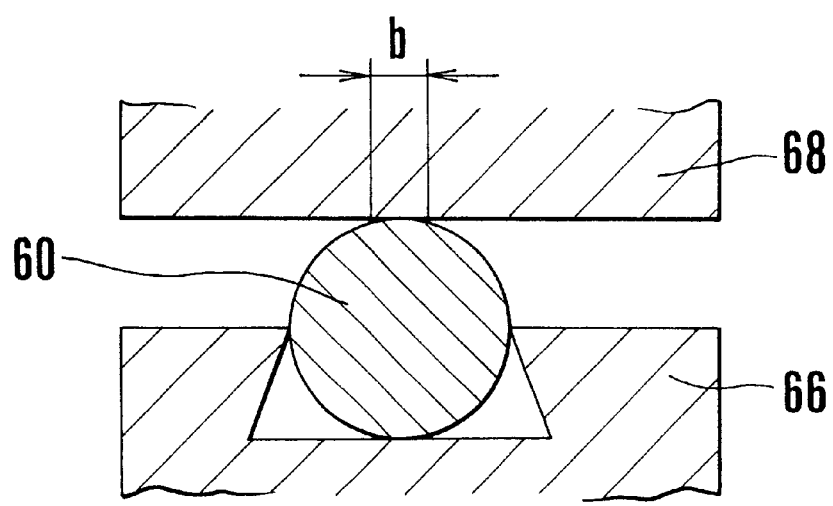
FIG. 2 shows the conventional example.
Figure 3:
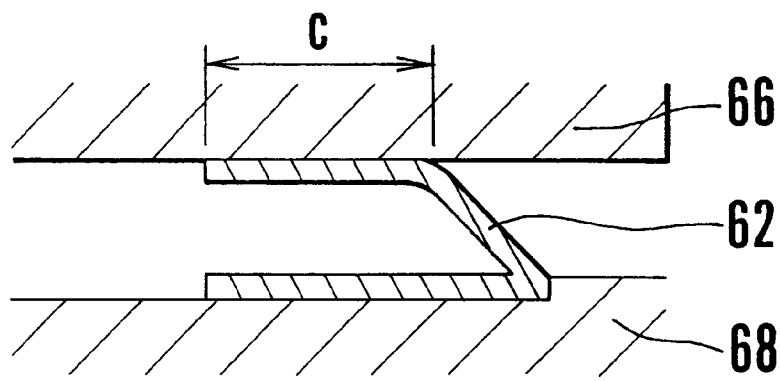
FIG. 3 shows another conventional example.
Figure 4:
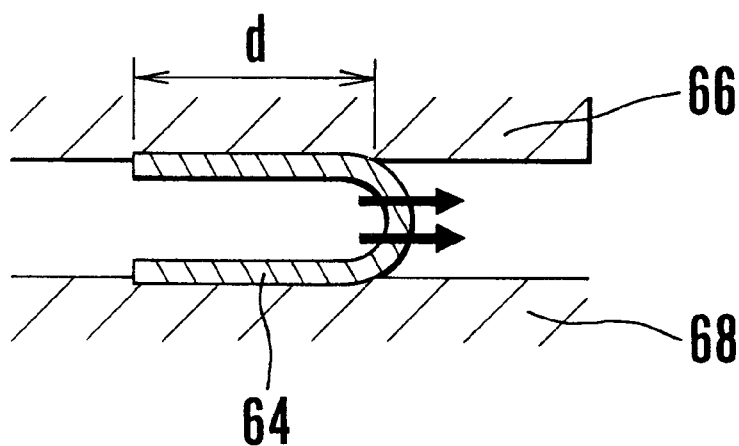
FIG. 4 shows still another conventional example.
Figure 5:
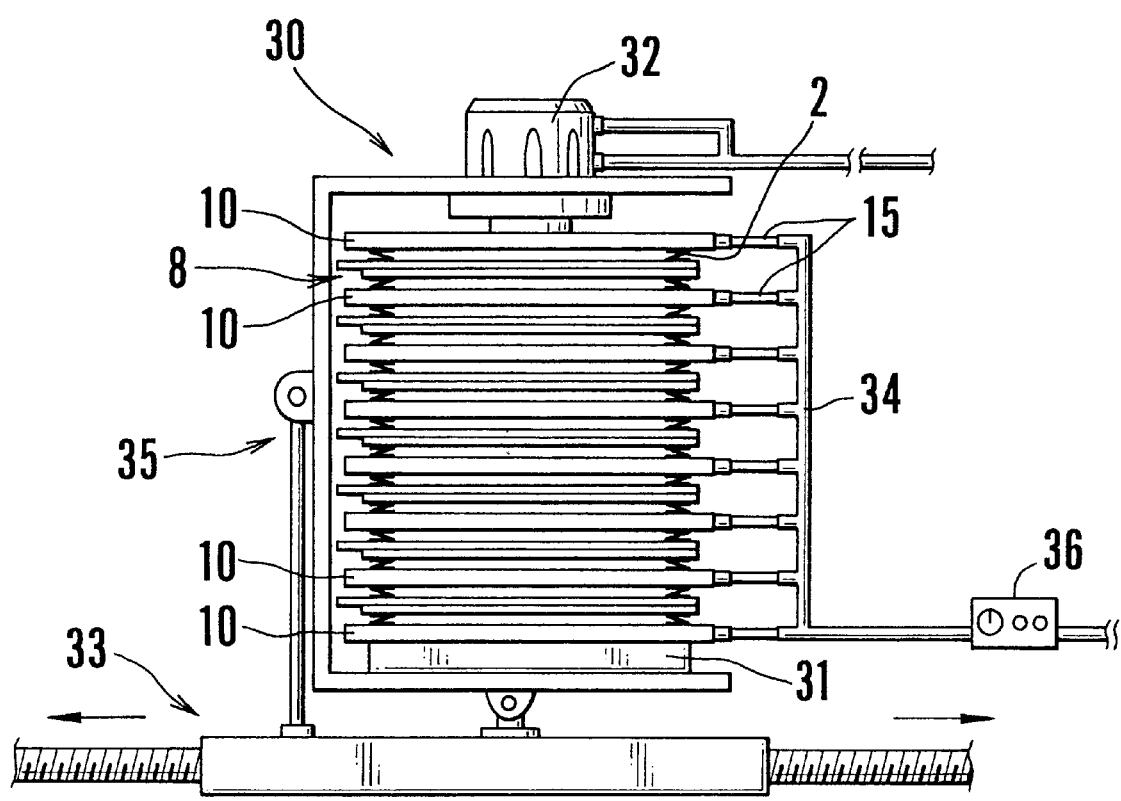
FIG. 5 shows a press unit according to the present invention.

FIG. 5 shows a press unit 30 for liquid crystal display element cells 8. As shown in FIG. 5, in the press unit 30, pressure plates 10 and the liquid crystal display element cells 8 are alternately stacked between a cylinder mechanism 32 and a base 31, and a pressurized gas pipe 34 is connected to the pressure plates 10 through a pressure adjustment switch 36.

The press unit 30 has the cylinder mechanism 32, the base 31, the pressurized gas pipe 34 for supplying compressed air to the cylinder mechanism 32, and the like, and its entire portion is placed on a moving mechanism 33.

The moving mechanism 33 moves the liquid crystal display element cells 8 to the respective regions of a rotary mechanism 35, a liquid crystal wiping mechanism (not shown), a UV material applying mechanism (not shown), and an UV irradiating mechanism (not shown). The rotary mechanism 35 moves the display surfaces of the liquid crystal display element cells 8 from the horizontal state to the vertical state in order to seal the openings of the liquid crystal display element cells 8 after gap adjustment. The liquid crystal wiping mechanism brings a roll-type wipe into contact with the openings to wipe off the remaining liquid crystal. The UV material applies a sealing member. The UV irradiating mechanism hardens the sealing member applied to the openings of the liquid crystal display element cells 8.

Figure 6:
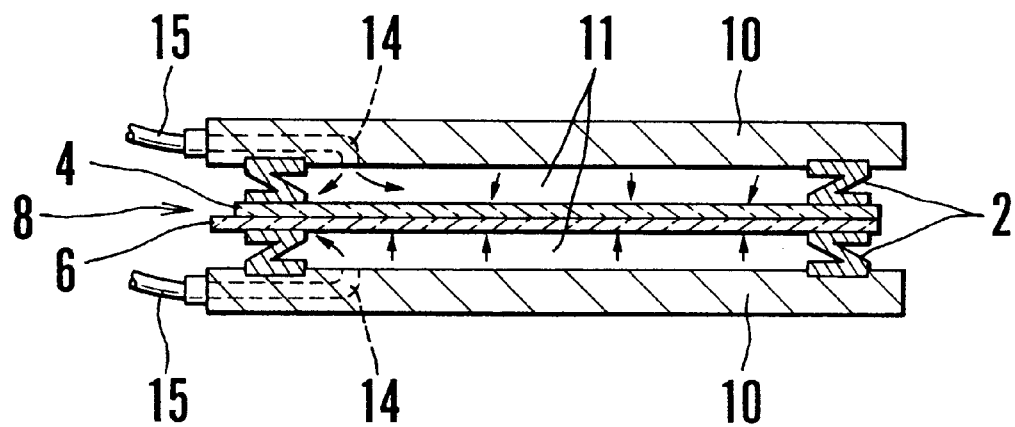
FIG. 6 shows an embodiment which utilizes Z-rings according to the present invention.
Figure 7:
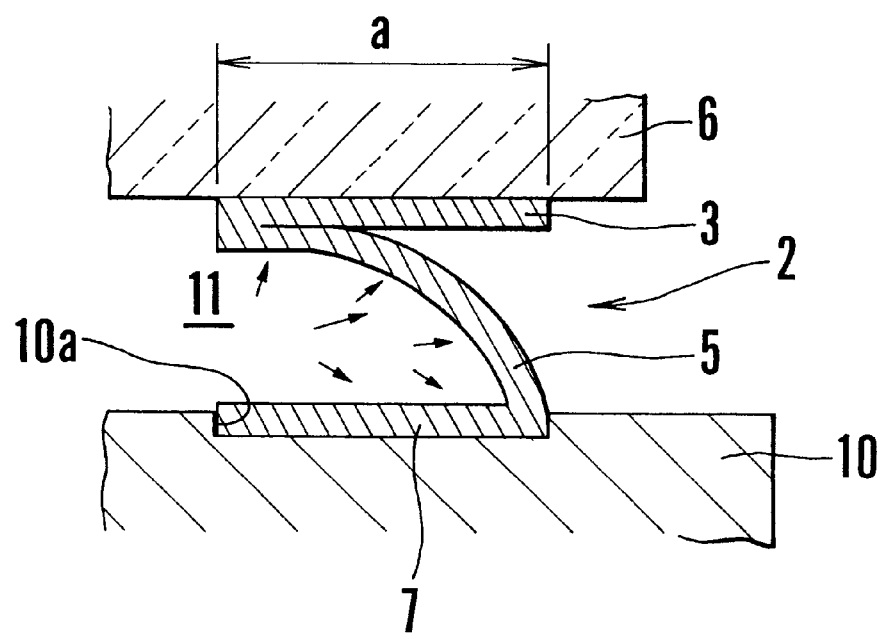
FIG. 7 shows a Z-ring.

FIG. 6 shows two pressure plates 10 and a liquid crystal display element cell 8. As is apparent from FIG. 6, the pressure plates 10 are placed on the two sides of the liquid crystal display element cell 8 which is obtained by adhering a TFT substrate 4 and a CF substrate 6 with a thermosetting adhesive (not shown) to maintain a predetermined gap between them. The two pressure plates 10 and the liquid crystal display element cell 8 are connected to each other through annular Z-rings 2. In this manner, pressure regions 11 are formed in spaces surrounded by the pressure plates 10, the liquid crystal display element cell 8, and the Z-rings 2.

Figure 8:
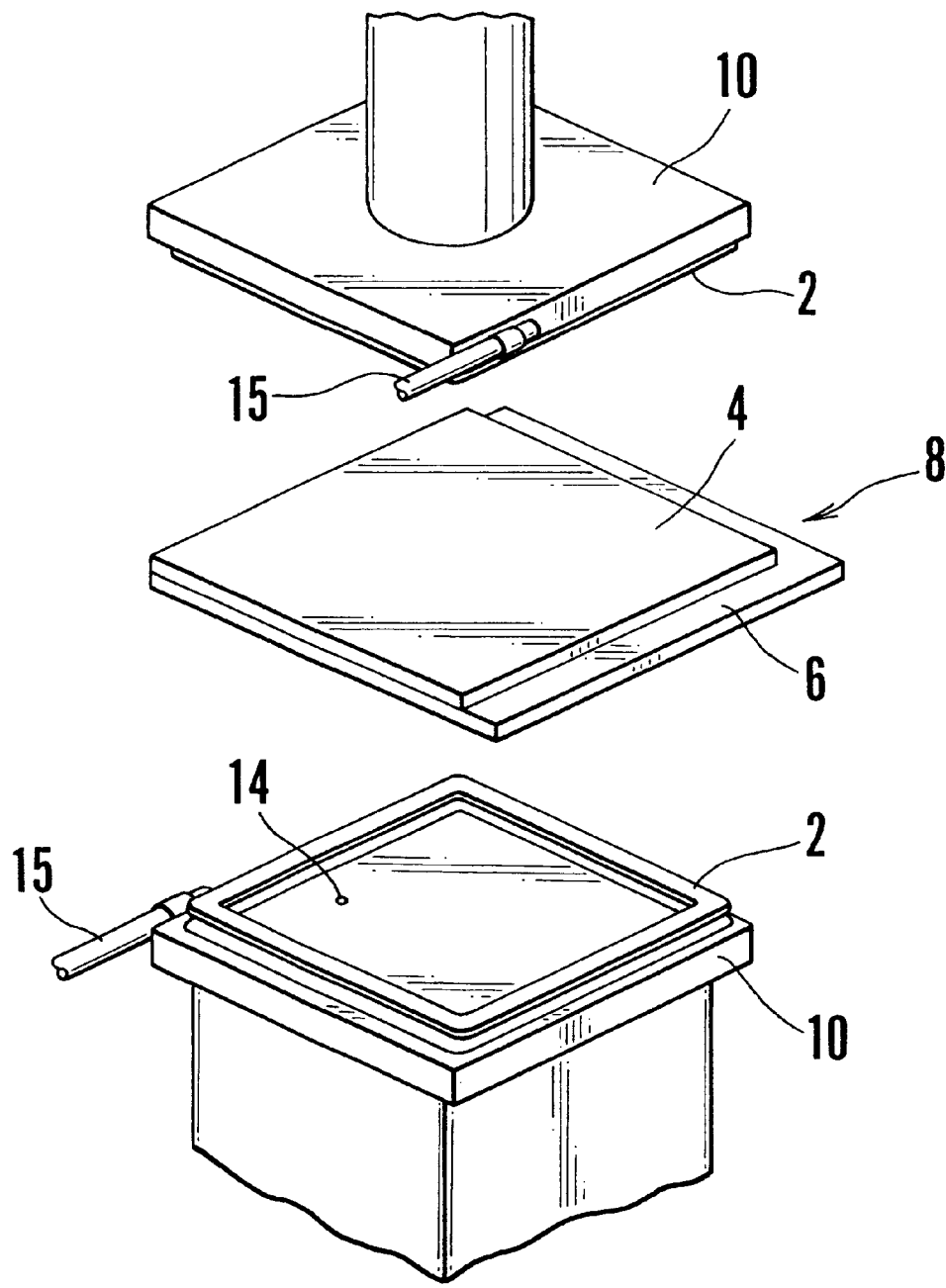
FIG. 8 shows the embodiment of the present invention.

As shown in FIG. 8 as well, the pressure plates 10 are connected to pressurized gas hoses 15 that fetch a pressurized gas. The pressurized gas flows through the pressurized gas hoses 15 and is injected into the pressure regions 11 through inlet ports 14 formed in the pressure plates 10.

The pressure adjustment switch 36 is a mechanism for adjusting the pressure of pressurized air sent from an air compressor (not shown). The pressure adjustment switch 36 adjusts the pressure in units of 0.1 kg/cm$^2$ and introduces the adjusted pressurized gas to the pressurized gas hoses 15.

Each pressure plate 10 is formed with a ring groove 10a for placing the Z-ring 2 at a position 5 mm inside the outer perimeter, and the Z-ring 2 is mounted in the ring groove 10a.

The Z-ring 2 is formed of an upper edge 3, a lower edge 7, and an inclined portion 5 to have a Z-shaped section. The Z-ring 2 is made of silicone rubber and is coated with Teflon. These materials are substantially the same as those of the conventionally used O-ring. The inclined portion 5 is inclined at about 30° to 45° with respect to the upper edge 3 or the like. Either one of the upper edge 3 and lower edge 7, i.e., an edge connected to a side toward which the inclined portion 5 is pressed by the pressurized air, is fitted in the ring groove 10a.

The liquid crystal display element cell 8 is the liquid crystal display element cell of a TFT active matrix type color liquid crystal panel, and is obtained by adhering the thin film transistor substrate 4 (to be referred to as the TFT substrate hereinafter) and the color filter substrate 6 (to be referred to as the CF substrate hereinafter) through a predetermined small gap. A liquid crystal is sealed in this gap.

An aligning film is formed on the TFT substrate 4, and a thermosetting adhesive is applied around the display region of the aligning film surface to leave an opening. The TFT substrate 4 is laid on the CF substrate 6 through a spacer (not shown). The resultant substrate structure is heated and pressed to calcined the thermosetting resin, so that the substrates 4 and 6 are adhered to each other. The liquid crystal is sealed in the liquid crystal display element cell 8 in the same manner as in the conventional method.

Gap adjustment of the liquid crystal display element cell 8 into which the liquid crystal has been injected will be described.

The liquid crystal display element cells 8 are clamped with the pressure plates 10, and are sequentially stacked horizontally. The stacked liquid crystal display element cells 8 are mounted on the press unit 30 and are pressurized with a predetermined pressure by driving the cylinder mechanism 32.

The pressurized gas is adjusted to a predetermined pressure by the pressure adjustment switch 36, and is supplied to the pressure regions 11, surrounded by the pressure plates 10, the Z-rings 2, and the liquid crystal display element cells 8, through the pressurized gas hoses 15 to press the liquid crystal display element cells 8 with a uniform pressure. Pressing is continued for a predetermined period of time until each liquid crystal display element cell 8 has an appropriate gap.

Since each liquid crystal display element cell 8 is sealed by the Z-rings 2, a sealing width a provides a sufficiently larger area than the sealing width of the conventional O-ring does, so that leakage does not occur from the contact point between the liquid crystal display element cell 8 and the Z-rings 2. Since the inclined portion 5 of each Z-ring 2 is lifted to the liquid crystal display element cell 8 side due to the pressure of the pressurized gas, the hermetic space can be sealed with a higher pressure than the pressure that clamps the liquid crystal display element cell 8, and a gap defect resulting from gas leakage does not occur.

When the gaps are appropriately formed into a predetermined size, in order to apply the sealing material to the openings, the press unit 30 is rotated by the rotary mechanism 35 to set the liquid crystal display element cells 8 vertically. Sometimes the liquid crystal material may ooze from the openings and the sealing material cannot be applied to them. To prevent this, the pressurized gas that presses the liquid crystal display element cells 8 is adjusted with the pressure adjustment switch 36 to reduce the pressure by a predetermined value, so that oozing of the liquid crystal is stopped.

In order to wipe the liquid crystal material oozing from the openings of the liquid crystal display element cells 8, prior to applying the sealing material to the openings of the liquid crystal display element cells 8, the wipe of the liquid crystal wiping mechanism (not shown) is brought into contact with the openings of the liquid crystal display element cells, to wipe the oozing liquid crystal material.

The moving mechanism 33 is actuated to move the liquid crystal display element cells 8 into the application region of the UV material applying mechanism (not shown) that applies the sealing material to the openings of the liquid crystal display element cells 8. Then, the sealing material is applied to the openings of the liquid crystal display element cells 8.

After the sealing material is applied to the openings of the liquid crystal display element cells 8, the sealing material must be withdrawn into the liquid crystal display element cells 8 for a predetermined amount in order to prevent leakage from the openings. For this purpose, the pressurized gas that presses the liquid crystal display element cells 8 is pressure-reduced by a predetermined value by adjusting the pressure adjustment switch 36. The liquid crystal display element cells 8 are then left to stand for a predetermined period of time to suck the sealing material into them for the predetermined amount.

In order to harden the sealing material which is applied to and sucked into the openings of the liquid crystal display element cells 8, the liquid crystal display element cells 8 are moved to the UV irradiating mechanism (not shown) by the moving mechanism 33. The openings of the liquid crystal display element cells 8 are irradiated with an ultraviolet ray for a predetermined period of time to set the sealing material which has been applied to and sucked into all of the openings of the liquid crystal display element cells 8 set on the press unit 30.

After irradiation, the liquid crystal display element cells 8 are moved to a predetermined position with the moving mechanism 33, and are set horizontally again with the rotary mechanism 35. The pressurized gas that presses the liquid crystal display element cells 8 is pressure-reduced by adjusting the pressure adjustment switch 36. The cylinder mechanism 32 of the press unit 30 is moved upward, and the liquid crystal display element cells 8 that are set in the press unit 30 are extracted.

Preferred practical embodiments of the present invention will be described.

The sealing pressure for the Z-rings 2 and the liquid crystal display element cells 8 is set at 0.2 to 0.3 kg/cm$^2$. Then, a pressurized gas is introduced into the pressure regions 11 through the inlet ports 14 of the pressure plates 10 to press the pressure regions 11 with a desired pressure of 0.6 kg/cm$^2$.

Subsequently, the liquid crystal display element cells 8 are held while fixing the pressure until the liquid crystal display element cells 8 have a predetermined gap (10 to 60 minutes).

Figure 9A:
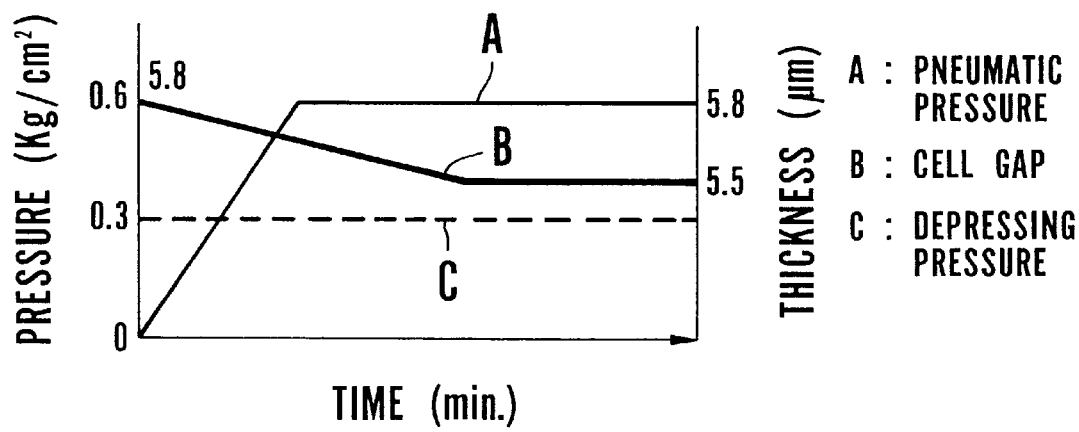
Figure 9B:
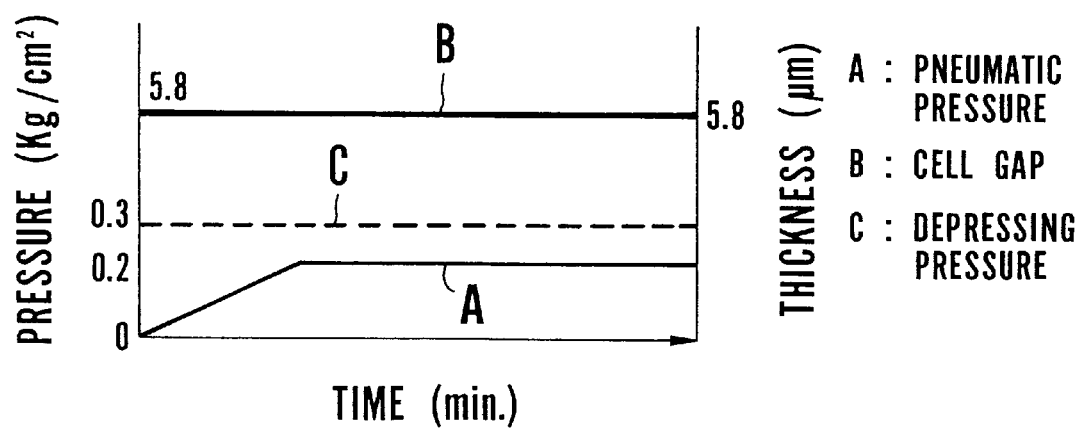

FIG. 9A shows a relationship between the pressure and cell gap of the liquid crystal display element cells 8 according to the present invention that employs the Z-rings 2. FIG. 9B shows a relationship between the pressure and cell gap of liquid crystal display element cells 8 in a case that uses O-rings as the conventional vacuum packing seal rings. FIGS. 9A and 9B will be compared. In FIG. 9A, the pressure acting on the liquid crystal display element cells 8 reaches 0.6 kg/cm$^2$, which is a predetermined value. In FIG. 9B, the pressure acting on the liquid crystal display element cells 8 does not reach 0.6 kg/cm$^2$, which is the predetermined value, but is 0.2 kg/cm², which does not even reach the sealing pressure of 0.3 kg/cm². This apparently shows that the Z-rings 2 have a higher anti-leakage performance than that of the conventional O-rings.

This result also shows the following fact. In FIG. 9A, the gap of the liquid crystal display element cells 8 is 5.5 μm, which is a predetermined value, whereas in FIG. 9B, the gap of the liquid crystal display element cells 8 does not reach a desired value but is 5.8 μm. This means that in FIG. 9B the gaps are not pressed.

Figure 10:
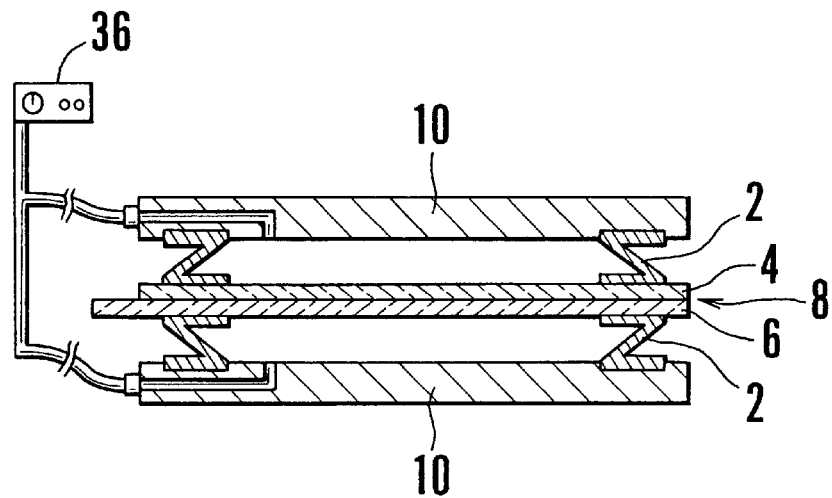
FIG. 10 shows another embodiment.
Figure 11:
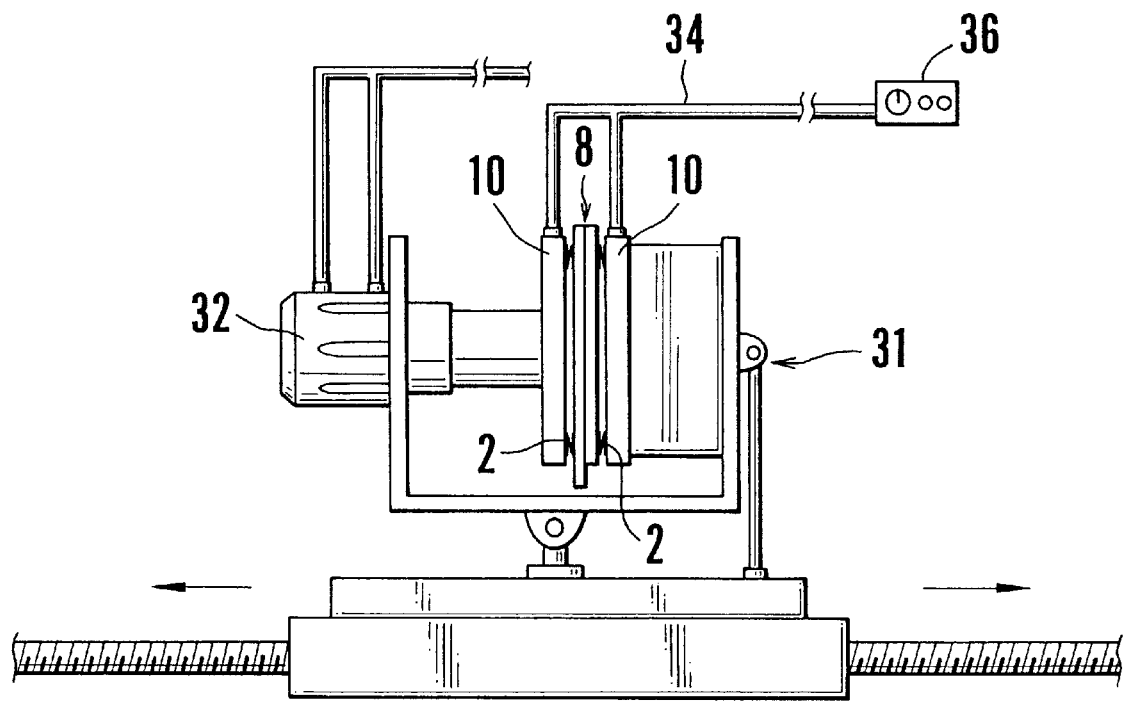
FIG. 11 shows still another embodiment.

In the above embodiments, a plurality of liquid crystal display element cells 8 are stacked. However, one liquid crystal display element cell 8 may be formed, as shown in FIGS. 10 and 11.

What is claimed is:

1. A method of sealing a liquid crystal display element cell having two substrates opposing each other such that a gap is formed therebetween, the method comprising the steps of:

positioning said liquid crystal display element cell between pressure plates of a pressure chamber, such that each of said two substrates opposes a pressure plate;

interposing a seal ring having a serpentine cross section between each of said two substrates and said pressure plate opposed thereto, thereby defining a pressure region on opposite sides of said liquid crystal display element;

injecting a liquid crystal through an opening of said liquid crystal display element cell to fill said gap formed between said two substrates; and providing a pressurized gas into said pressure regions to adjust said gap formed between said two substrates.

2. A method according to claim 1, wherein the serpentine cross section has a Z shape.

3. A method according to claim 2, further including the steps of:

positioning end portions of said Z-shaped cross section respectively in contact with said substrate and said pressure plate opposed thereto, such that a center portion of said Z-shaped cross section extends between said substrate and said pressure plate opposed thereto.

4. A method according to claim 1, further including the step of:

applying an ultraviolet-curing resin to the opening.

5. A method according to claim 4, further including the step of:

irradiating the ultraviolet-curing resin.

6. An apparatus for sealing a liquid crystal display element cell having two substrates opposing each other such that a gap is formed therebetween, the apparatus comprising: spaced apart pressure plates, each having a groove, and a pressurized air injection port in an inner side thereof which is surrounded by said groove, said pressure plates receiving said liquid crystal display element cell therebetween; and a seal ring provided in each groove and extending to a respective one of said two substrates to form a pressure region on opposing sides of said liquid crystal display element cell;

wherein said seal ring has serpentine cross section.

7. An apparatus according to claim 6, further comprising:

a wiping mechanism for wiping a liquid crystal from an opening of said liquid crystal display element cell;

a UV material applying mechanism for applying an ultraviolet-curing resin to said opening;

a UV irradiating mechanism for irradiating said ultraviolet-curing resin;

a moving mechanism for moving said liquid crystal display element cell to said wiping mechanism, said UV material applying mechanism, and said UV irradiating mechanism; and a rotary mechanism for rotating said liquid crystal display element cell.

8. An apparatus according to claim 6, wherein a plurality of liquid crystal display element cells and said pressure plates are stacked alternately.

9. An apparatus according to claim 6, wherein said seal rings are made of synthetic rubber.

10. An apparatus according to claim 6, further including:

a pressure mechanism for pressing said pressure plates with a predetermined pressure.

11. An apparatus according to claim 6, further including:

a compressed gas supply mechanism for supplying a pressurized gas of a predetermined pressure to said injection port.

12. An apparatus according to claim 6, wherein said serpentine cross section has a Z shape.

13. An apparatus according to claim 12, wherein (1) end portions of said Z-shaped cross section are in respective contact with one of said two substrates and an opposing pressure plate, and (2) a center portion of said Z-shaped cross section extends between said one substrate and said opposing pressure plate.

14. An apparatus according to claim 13, wherein each of said seal rings is mounted such that a pressure plate side of said center portion is located laterally outwardly with respect to said substrate side of said center portion.

* * * * *

UNITED STATES PATENT AND TRADEMARK OFFICE
CERTIFICATE OF CORRECTION

PATENT NO. : 6,005,653
DATED : December 21, 1999
INVENTOR(S) : Tadashi MATSUZAWA It is certified that error appears in the above-identified patent and that said Letters Patent is hereby corrected as shown below:

In the title, after "CELL" insert --EMPLOYING SEAL MEMBERS WITH Z-SHAPED CROSS SECTIONS THAT FORM PRESSURE REGIONS--.

Signed and Sealed this

Twenty-fourth Day of April, 2001

*Attest:*

NICHOLAS P. GODICI

*Attesting Officer*  *Acting Director of the United States Patent and Trademark Office*